(12) United States Patent
Shetty et al.

(10) Patent No.: US 10,501,376 B2
(45) Date of Patent: Dec. 10, 2019

(54) FUNCTIONALLY GRADED CARBIDES

(71) Applicant: University of Utah Research Foundation, Salt Lake City, UT (US)

(72) Inventors: Dinesh Shetty, Salt Lake City, UT (US); Raymond Cutler, Salt Lake City, UT (US); Michael M. Sygnatowicz, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 3 days.

(21) Appl. No.: 15/545,248

(22) PCT Filed: Jan. 22, 2016

(86) PCT No.: PCT/US2016/014552
§ 371 (c)(1),
(2) Date: Jul. 20, 2017

(87) PCT Pub. No.: WO2016/118879
PCT Pub. Date: Jul. 28, 2016

(65) Prior Publication Data
US 2018/0290933 A1    Oct. 11, 2018

Related U.S. Application Data

(60) Provisional application No. 62/125,488, filed on Jan. 22, 2015.

(51) Int. Cl.
*C04B 35/56* (2006.01)
*B32B 15/04* (2006.01)
(Continued)

(52) U.S. Cl.
CPC .......... *C04B 35/5607* (2013.01); *B32B 15/04* (2013.01); *C22C 1/055* (2013.01);
(Continued)

(58) Field of Classification Search
CPC ..... B32B 15/01; B32B 15/011; B32B 15/013; B22F 3/1055; B22F 7/04; B22F 7/02;
(Continued)

(56) References Cited

U.S. PATENT DOCUMENTS 4,752,456 A    6/1988 Yoda et al.
4,942,062 A    7/1990 Ducarroir et al.
(Continued)

FOREIGN PATENT DOCUMENTS

CN    101724760 A    6/2010
JP    2008/081362 A    4/2008
(Continued)

OTHER PUBLICATIONS

Gusev et al. Atomic and vacancy ordering in carbide ζ-Ta4C3-x (0.28×0.40) and phase equilibria in the Ta—C system. Journal of Solid State Chemistry, vol. 180, Issue 11, Nov. 2007, pp. 3234-3246.*

(Continued)

*Primary Examiner* — Noah S Wiese
(74) *Attorney, Agent, or Firm* — Thorpe North & Western, LLP

(57) ABSTRACT

A functionally graded carbide body (400) can include a group 5 metal carbide substrate having a bulk composition region (410) that contains at least 70 wt % of a rhombohedral ζ-phase carbide. A γ-phase-rich region (420) having a γ-phase-rich composition can be at a surface (430) of the substrate, and a phase composition gradient region (440) can transition from the γ-phase-rich composition region at the surface to the bulk composition region at a gradient depth (450) below the surface.

16 Claims, 9 Drawing Sheets

(51) Int. Cl.
*C22C 27/02* (2006.01)
*C22C 29/02* (2006.01)
*C22C 1/05* (2006.01)
*C22C 29/06* (2006.01)

(52) U.S. Cl.
CPC .............. *C22C 27/02* (2013.01); *C22C 29/02* (2013.01); *B22F 2207/01* (2013.01); *B22F 2998/10* (2013.01); *B22F 2999/00* (2013.01); *C22C 29/06* (2013.01)

(58) Field of Classification Search
CPC ...... B23K 26/342; B23K 31/02; B23K 20/10; B05D 1/36; B05D 1/18; C22C 38/14; C22C 38/08; C22C 38/40; C23C 4/12; C04B 35/64; C04B 35/01
See application file for complete search history.

(56) References Cited

U.S. PATENT DOCUMENTS

| | | | |
|---|---|---|---|
| 5,190,890 | A | 3/1993 | Precht et al. |
| 7,887,747 | B2 | 2/2011 | Iwasaki et al. |
| 8,163,232 | B2 | 4/2012 | Fang et al. |
| 8,211,244 | B2 | 7/2012 | Kaneko et al. |
| 8,414,677 | B2 | 4/2013 | Schlesser et al. |
| 8,685,874 | B2 | 4/2014 | Shetty et al. |
| 2005/0064247 | A1 | 3/2005 | Sane et al. |
| 2006/0057287 | A1 | 3/2006 | Foss et al. |
| 2011/0189504 | A1 | 8/2011 | Zou et al. |
| 2011/0287923 | A1 | 11/2011 | Shetty et al. |
| 2015/0044084 | A1* | 2/2015 | Hofmann ................ B32B 15/01 419/7 |

FOREIGN PATENT DOCUMENTS

| | | | | |
|---|---|---|---|---|
| WO | WO 2013/112217 | A2 | 8/2013 | |
| WO | WO2013112217 | A2 * | 8/2013 | ............. B32B 15/04 |

OTHER PUBLICATIONS

Gusev et al.; "Atomic and Vacancy Ordering in Carbide zeta-Ta4C3-x ($028 <= x <= 0.40$) and Phase Equilibria in the Ta—C System." Journal of Solid State Chemistry; Elsevier; Nov. 2007; vol. 180, Issue 11; pp. 3234-3246.

Hartmann et al.; "Preparation and Characterisation of Tantalum Carbide as an Optional Crucible Material for Bulk Aluminum Nitride Crystal Growth via Physical Vapour Transport." Physica Status Solidi; Wiley; vol. 3, Issue 6; pp. 1608-1612.

Khaleghi et al.; "Spark Plasma Sintering of Tatalum Carbide." Scripta Materialia; Elsevier; Sep. 2010; vol. 63, Issue 6; pp. 577-580.

Morris et al.; "Microstructural Formations and Phase Transformation Pathways in Hot Isostatically Pressed Tatalum Carbides." Acta Materialia; Elsevier; Jan. 2012; vol. 60, Issue 1; pp. 139-148.

Morris et al.; "Microstructural Formations and Phase Transformation Pathways in Tantalum Carbides." University of Alabama; Robert Allen Morris; 2010; 155 Pages.

PCT Application No. PCT/US16/14552; Filing Date Jan. 22, 2016, Michael M. Sygnatowicz, International Search Report dated Jun. 3, 2016, 12 Pages.

ropine.com.; "Chapter 8—Introduction and Background on Transition Metal Carbides." http://ropine.com/chapter8.html; 6 Sections; Date accessed Feb. 19, 2015; 18 Pages.

Rubinstein et al.; "Surface Treatment of Tantalum to Improve its Corrosion Resistance." Materials Science and Engineering: A; Elsevier; Apr. 15, 2001; vol. 302, Issue 1; pp. 128-134.

Wen-Li et al.; "First-Principles Investigation on Mechanical Properties of $\zeta$-Ta$_4$C$_{3-x}$1." Mar. 15 Meeting of the American Physical Society; Abstract; 1 Page.

* cited by examiner

FUNCTIONALLY GRADED CARBIDES

RELATED APPLICATION

This application claims priority to U.S. Provisional Patent Application No. 62/125,488, filed Jan. 22, 2015 which is incorporated herein by reference.

BACKGROUND

Hard materials, used in such applications as cutting tools for machining and wear inserts in rock drilling tools, have evolved from high-speed tools steels, to cemented carbides, cermets, ceramics, polycrystalline cubic boron nitride (CBN) and polycrystalline diamond (PCD). This evolution was driven by the need for higher hardness, particularly at high temperatures, to reduce wear at higher cutting speeds to increase productivity. But, the increased hardness has been achieved at the expense of fracture toughness, and the low toughness ceramic tools have been limited to applications with low feed rates and uninterrupted cutting.

Ideally, a tool material should possess a combination of high hardness to resist wear and abrasion, high fracture toughness to resist thermal and mechanical shock, and chemical and thermal stability to resist interaction with the stock. The requirements of high hardness and high fracture toughness are not easy to achieve in a single-phase material via control of the microstructure. A fine grain size, for example, enhances hardness, usually at the expense of fracture toughness. Even in two-phase materials designed for wear and abrasion resistance, such as cemented carbides (WC+Co) and cermets (TiC+Ni), the relative amounts of the carbide phase and the binder phase are optimized to achieve a compromised combination of hardness and fracture toughness.

SUMMARY

A functionally graded carbide body of a group 5 metal carbide can have a γ-phase-rich region at one or more surfaces. The body can have a bulk composition region that includes at least 70 wt % of a rhombohedral ζphase carbide. A phase composition gradient region can transition from the γ-phase-rich composition region at the surface to the bulk composition region at a gradient depth below the surface.

A method of making a functionally graded carbide body can include obtaining a group 5 metal carbide substrate having a bulk composition region comprising at least 70 wt % of a rhombohedral ζphase carbide. A surface of the group 5 metal carbide substrate can be treated with a carbon-containing gas at a carburization temperature. This can form a γ-phase-rich region having a γ-phase-rich composition region at the surface and a phase composition gradient region transitioning from a γ-phase-rich composition region at the surface to the bulk composition region at a gradient depth below the surface.

Additional features and advantages of these principles will be apparent from the following detailed description, which illustrates, by way of example, features of the invention.

Figure 1:
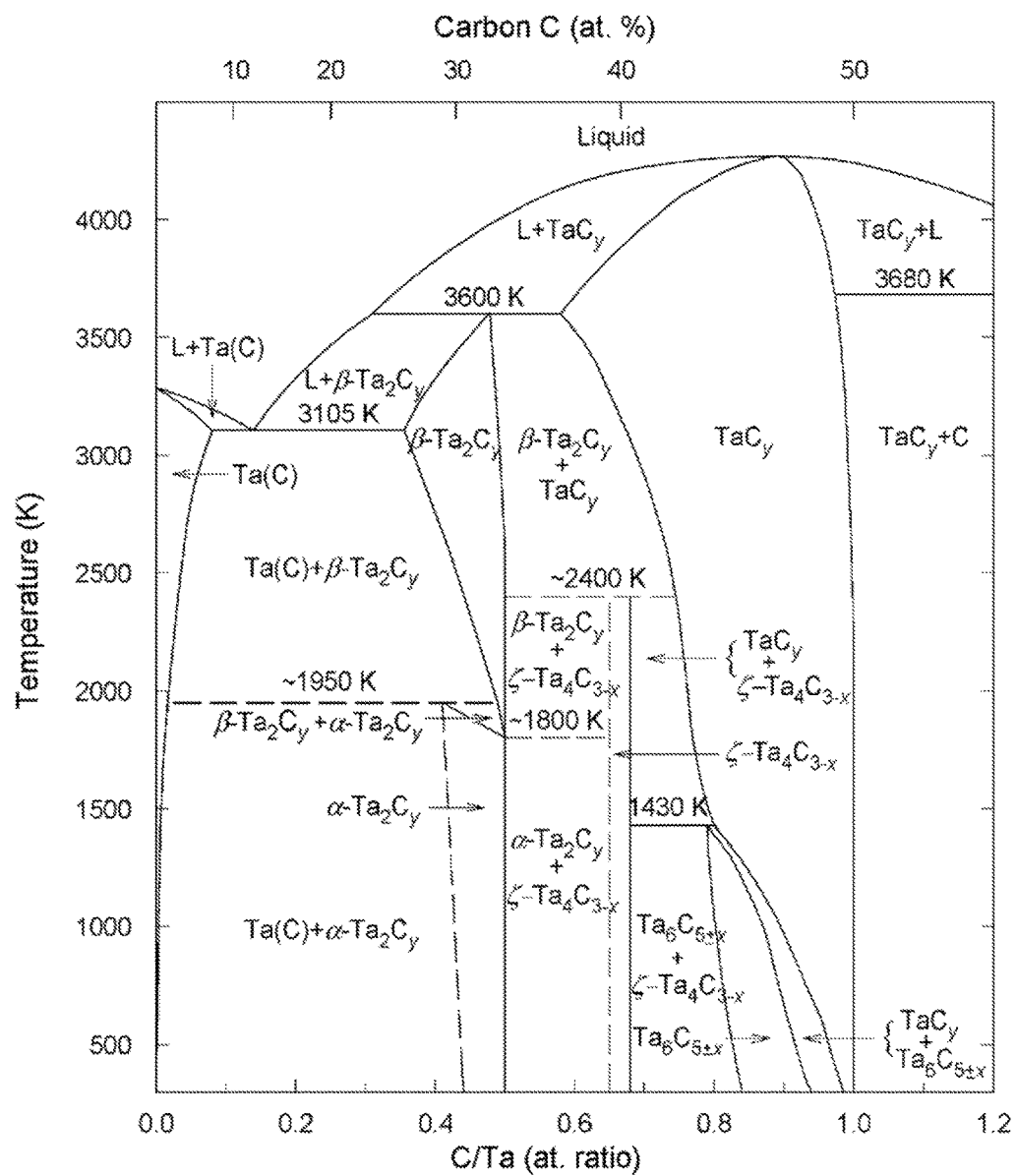
FIG. 1 shows a phase diagram of the tantalum-carbon (Ta—C) binary system.

It should be noted that the figures are merely exemplary of several embodiments and no limitations on the scope of the present invention are intended thereby. Further, the figures are generally not drawn to scale, but are drafted for purposes of convenience and clarity in illustrating various aspects of the invention.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a surface" includes reference to one or more of such structures, "a carbide body" includes reference to one or more of such materials, and "a treating step" refers to one or more of such steps.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "group 5 metal" refers to any metal in the fifth group of the periodic table. In many embodiments of the present technology, the group 5 metal can be vanadium, niobium, or tantalum.

As used herein, "phase composition gradient" refers to a change in an amount of at least one phase present in a carbide material over a finite distance. For example, a phase composition gradient can transition from a first carbide phase to a second carbide phase. However, the phase composition gradient does not necessarily transition between pure phases. A phase composition gradient generally can transition from a first composition of one or more phases to a second composition with different phase contents. In one example, a phase composition gradient transitions from a substantially pure γ-phase group 5 metal carbide to a bulk composition that includes a majority of ζ-phase group 5 metal carbide with a small amount of the γ-phase carbide. A phase composition gradient can transition gradually from first phase composition to the second phase composition. While phase composition can vary, corresponding chemical composition can remain constant or vary across the phase composition gradient, although at equilibrium chemical composition can generally be constant over a phase composition gradient region. Thus, the phase composition gradient does not have discrete boundaries between different phase compositions, as would occur when a layer of one phase of carbide material is deposited onto another phase of carbide material.

As used herein, "chemical composition gradient" refers to a change in relative amounts of atomic elements in a material. For example, in a group 5 metal carbide, a chemical composition gradient can refer to a change in relative amounts of carbon and group 5 metal atoms. Such a chemical composition gradient transitions from one carbon to group 5 metal atomic ratio to another ratio. In some cases, a single phase of a group 5 metal carbide can exist over a range of different chemical compositions, e.g., relative amounts of carbon and metal atoms. Therefore, a region having a single, pure carbide phase can have a chemical composition gradient in the region as long as the carbon to metal atomic ratio remains within the stable range for the carbide phase (e.g. reference to a corresponding phase diagram).

As used herein, "pure carbide" refers to a material that contains only carbide, without a metal binder as is used in cemented carbides. The term "pure carbide" does not imply that the material has a uniform phase composition or metal/carbon ratio throughout the entire material. For example, in a pure tantalum carbide, the ratio of tantalum to carbon can vary either in a single phase, or by forming multiple different phases of tantalum carbide. Nevertheless, the entire tantalum carbide material is still referred to as a pure carbide.

As used herein, "Knoop hardness" and "HK0.1" refer to a hardness score of a material using the Knoop microhardness test. This test is performed by pressing a diamond indenter into a surface with a known load, in this example 0.1 kg. The long diagonal of the resulting impression is measured, and the Knoop hardness, HK0.1, in units of GPa is calculated using the following formula given in ASTM Standard C 1326-03 Standard Test Method for Knoop Indentation Hardness of Advanced Ceramics:

$$HK0.1 = 0.014229\left(\frac{P}{d^2}\right) \quad (1)$$

In Eq. (1), P is the indentation load in Newtons, and d is the long diagonal of the Knoop impression in mm.

As used herein, "fracture toughness" and "$K_{Ic}$" refer to a property describing the ability of a material containing a crack to resist fracture. Values of $K_{Ic}$ reported herein were measured using the single-edge-precracked-beam test described in ASTM Standard C 1421-10 Standard Test Methods for Determination of Fracture Toughness of Advanced Ceramics at Ambient Temperature.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Functionally Graded Carbides

Functional grading is an approach to tailoring microstructure and mechanical properties of a hard material for wear and abrasion applications. For example, functional grading of cemented carbides can be achieved by sintering techniques that lead to either a binder-free surface layer or a graded binder content increasing from the surface to the bulk. Functionally-graded cemented carbide cutting tools have shown improved performance in metal cutting relative to conventional cutting tools. The improved performance has been attributed to both the graded microstructure that produces a hard surface and a tough interior and a compressive residual stress produced in the surface region due to gradients in density or thermal-expansion mismatch associated with gradients in phase distribution.

Pure carbides are a class of materials that is entirely made up of carbides. Thus, pure carbides are distinct from cemented carbides, in which carbide particles are bound together by a metallic binder. The present disclosure describes functionally graded carbides that can be pure or substantially pure carbides. Functionally graded pure carbides can provide advantages over functionally graded cemented carbides. Pure carbides typically have much higher melting temperatures than the metals used as binders in cemented carbides. This property allows functionally graded pure carbides to retain their enhanced hardness and fracture toughness properties at higher operating temperatures than cemented carbides. Additionally, pure carbides can have better corrosion resistance than cemented carbides. Engineered surface coatings and laminated carbide ceramics represent some progress in the direction of functionally graded pure carbides. But, true functional grading via tailoring of microstructure or phase content has been elusive due to difficulty in tailoring the near-surface microstructure during processing or obtaining high hardness and high fracture toughness in the same ceramic system by changing the microstructure or phase distribution.

The tantalum-carbon (Ta—C) binary system allows for functional grading because of the presence of two carbides, adjacent to each other on the phase diagram, with widely differing mechanical properties. These carbides can be seen on the phase diagram of the Ta—C binary system shown in FIG. 1. The two carbides are $\gamma$-TaC$_y$ ($0.78 \leq y \leq 1$), a hard and brittle face-entered-cubic (fcc) carbide and a tough, but not hard, rhombohedral carbide, $\zeta$Ta$_4$C$_{3-x}$ ($0.28 \leq x \leq 0.4$). The $\zeta$ phase carbide can be formed in a nearly-single-phase, polycrystalline substrate having near theoretical density by reaction sintering of Ta and $\gamma$-TaC powder mixtures with or without the application of pressure. Methods for forming such bulk $\zeta$Ta$_4$C$_{3-x}$ carbides are described in WO/2010/008839, U.S. Pat. No. 8,685,874, and U.S. patent application Ser. No. 14/742,616, which are each hereby incorporated by reference.

Each phase of tantalum carbide has unique properties. The $\gamma$-TaC$_y$ phase has a high hardness (H=13.5-20 GPa) but lower fracture toughness (K$_{Ic}$=3.8-5.3 MPa$\sqrt{m}$). The $\zeta$-Ta$_4$C$_{3-x}$ phase has a high fracture toughness (K$_{Ic}$=13.5-15.5 MPa$\sqrt{m}$) but a lower hardness (H=5.5-7 GPa). There is also an $\alpha$-Ta$_2$C$_{y'}$ phase at C/Ta ratios from 0.44 to 0.5. This phase has intermediate hardness and fracture toughness (H=9.3 GPa and K$_{Ic}$=8.3 MPa$\sqrt{m}$). Thus, $\zeta$-Ta$_4$C$_{3-x}$ exhibits high fracture toughness. The $\zeta$Ta$_4$C$_{3-x}$ phase also exhibits rising-crack-growth-resistance (R-curve) behavior that is associated with bridging of cracks by lamellae formed by the easy cleavage of basal planes of the $\zeta$-phase.

Figure 2:
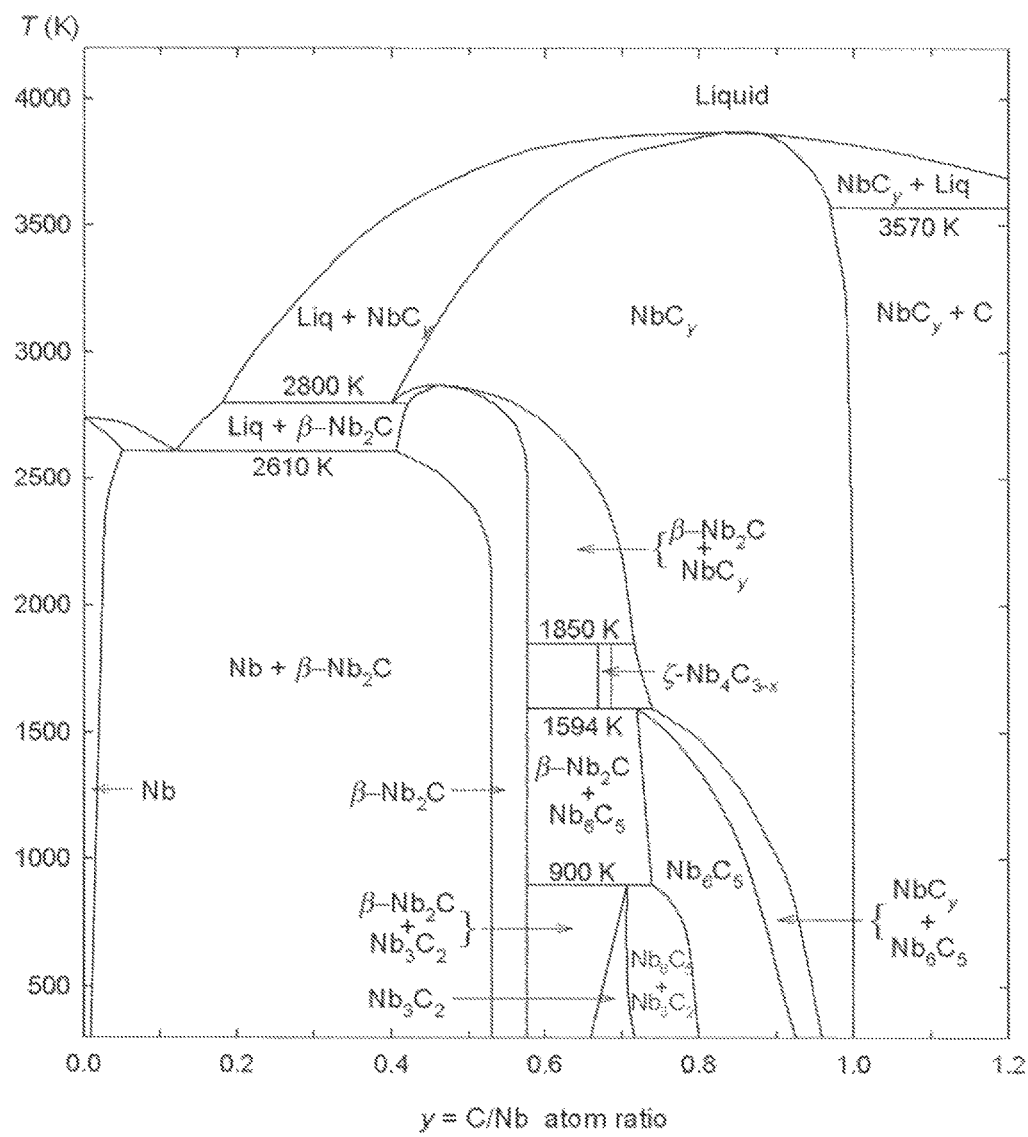
FIG. 2 shows a phase diagram of the niobium-carbon (Nb—C) binary system.
Figure 3:
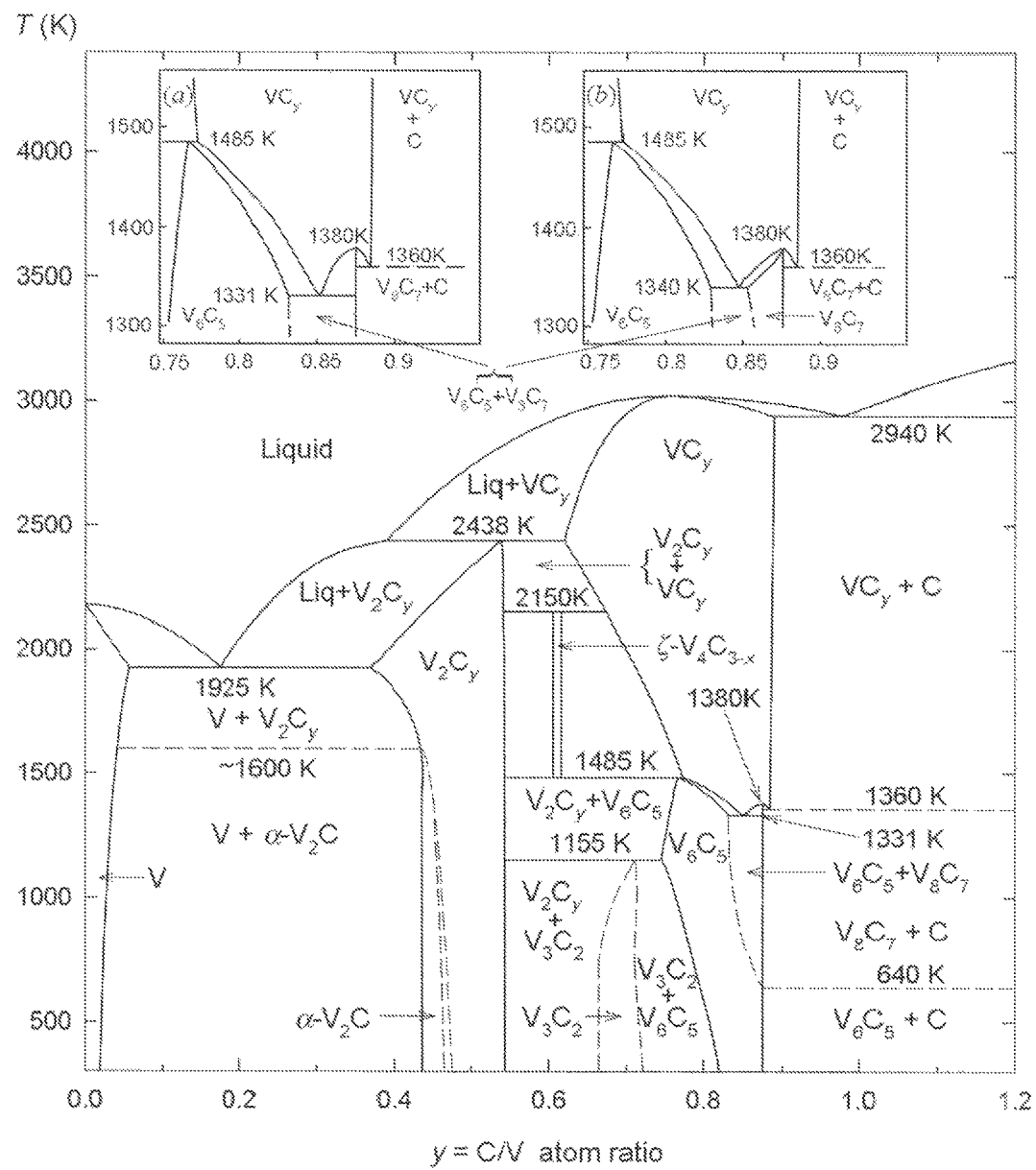
FIG. 3 shows a phase diagram of the vanadium-carbon (V—C) binary system.

Similar carbide phases exist for the other group 5 metals, niobium and vanadium. FIG. 2 shows a phase diagram for the niobium-carbon (Nb—C) binary system. The Nb—C system has a $\zeta$-Nb$_4$C$_{3-x}$ phase next to a $\gamma$-NbC$_y$ phase. FIG. 3 shows a phase diagram for the vanadium-carbon (V—C) binary system. The V—C system also has a $\zeta$-V$_4$C$_{3-x}$ phase next to a $\gamma$-VC$_y$ phase. These phases allow functionally graded carbides to be formed using niobium carbide and vanadium carbide. Although much of the description herein focuses on tantalum carbides, the functionally graded carbides and methods of making functionally graded carbides disclosed herein can also include niobium carbides and vanadium carbides.

With this description in mind, the present technology encompasses functionally graded carbides. In one embodiment, a functionally graded carbide body can include a group 5 metal carbide substrate. The substrate can have a bulk composition comprising at least 70 wt % of a rhombohedral $\zeta$-phase carbide. The functionally graded carbide body can also include a $\gamma$-phase-rich region having a $\gamma$-phase-rich composition region at a surface of the group 5 metal carbide substrate. A phase composition gradient region can transition from the $\gamma$-phase-rich composition region at the surface to the bulk composition region at a gradient depth below the surface. Although the functionally graded carbide body can typically be a pure carbide, the body can optionally include additives such as, but not limited to, binders, alloying elements, interstitial additives, and the like.

Figure 4:
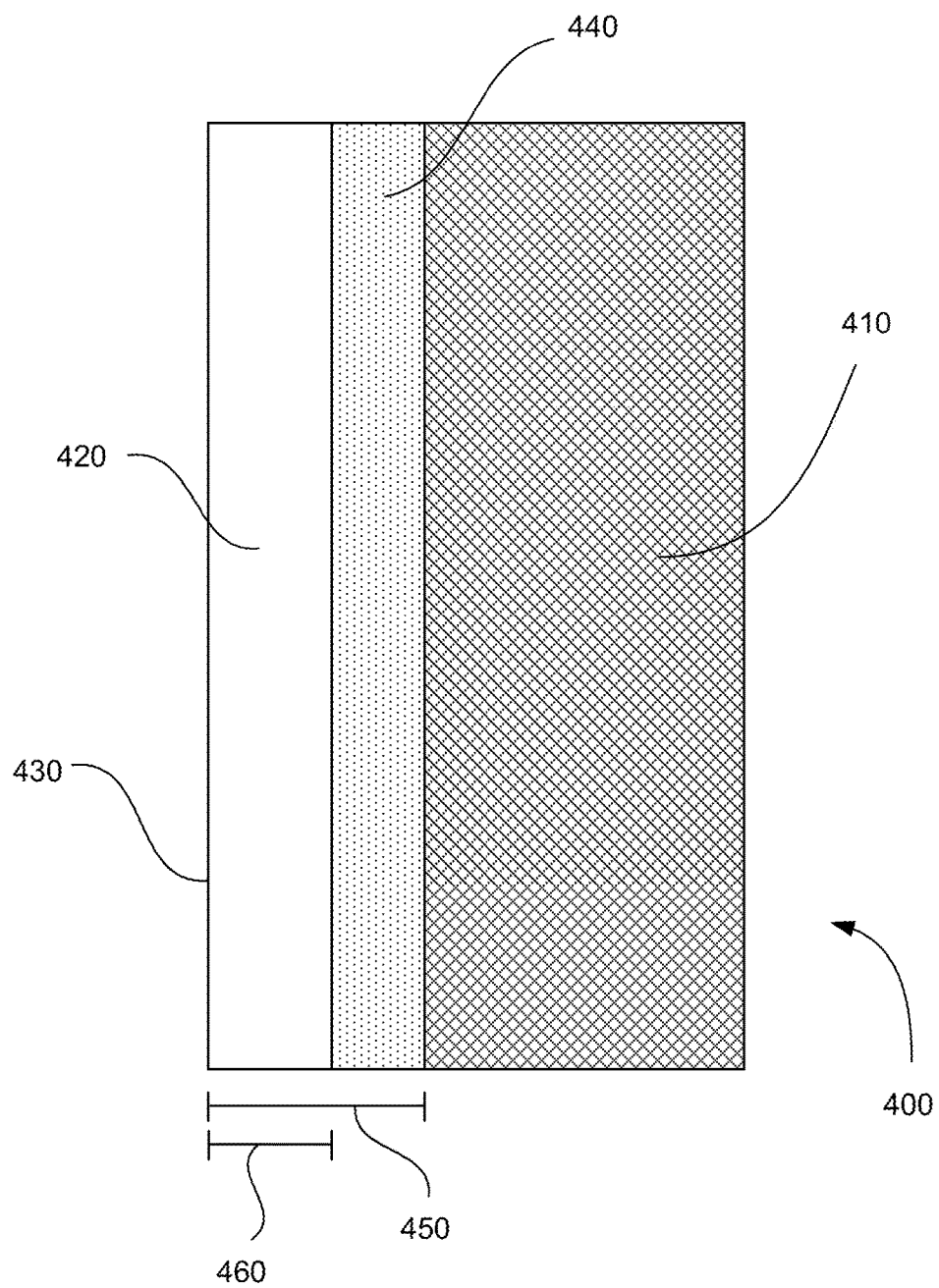
FIG. 4 shows a schematic cross-sectional view of a functionally graded carbide body in accordance with an embodiment of the present technology.

FIG. 4 shows a schematic cross-sectional view of a functionally graded carbide body according to an example of the present technology. A group 5 metal substrate 400 has a bulk composition region 410. The bulk composition is at least 70 wt % of the rhombohedral $\zeta$-phase carbide. A $\gamma$-phase-rich region 420 having a $\gamma$-phase-rich composition region is at the surface 430 of the substrate. A phase composition gradient region 440 transitions from the $\gamma$-phase-rich composition region to the bulk composition region 410 at a gradient depth 450 below the surface 430. Specifically, the gradient depth 450 is the depth below the surface 430 at which the phase composition gradient reaches the same composition as the bulk composition region 410. The particular embodiment shown in the figure also has a first depth 460 at which the $\gamma$-phase-rich region 420 ends and the phase composition gradient region 440 begins to transition to the bulk composition region 410. In this region, the amount of $\gamma$-phase present decreases while the amount of $\zeta$-phase increases, until the bulk composition is reached at the gradient depth 450.

Figure 5:
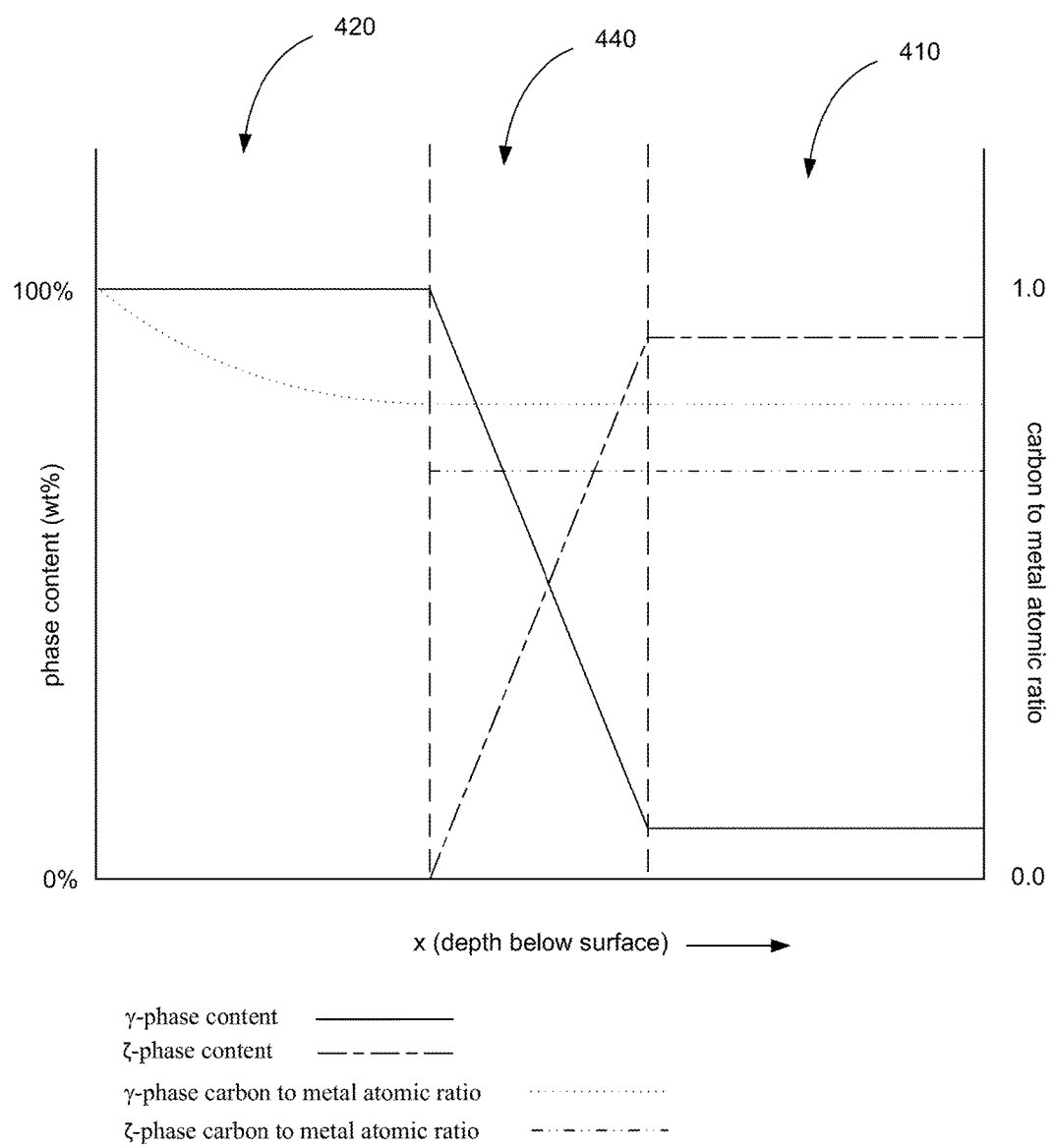
FIG. 5 shows a conceptual graph of phase content and carbon to group 5 metal atomic ratio vs. depth beneath a surface of a functionally graded carbide body in accordance with an embodiment of the present technology.

In order to clarify the phase composition gradient described above, FIG. 5 shows a conceptual graph of phase content and carbon to group 5 metal atomic ratio vs. depth beneath a surface of a functionally graded carbide body in accordance with an embodiment of the present technology. The graph shows the phase content and carbon to metal ratios in the $\gamma$-phase-rich region 420, phase composition gradient region 440, and bulk composition region 410. It should be noted that FIG. 5 is not drawn to scale and is intended only to represent these properties conceptually. As shown in FIG. 5, the $\gamma$-phase-rich region has a phase content of 100% $\gamma$-phase. However, the carbon content in this region is not uniform (e.g. exhibits a chemical composition gradient). The carbon to metal atomic ratio starts at 1.0 at the surface and decreases to a lower ratio at the phase composition gradient region (e.g. about 78% in the case of Ta—C). Across the phase composition gradient region 440, the carbon to metal ratio in the $\gamma$-phase is constant. This ratio represents the lower limit of the carbon to metal ratio in the $\gamma$-phase. In the phase composition gradient region 440, the $\zeta$-phase content increases from 0% to the bulk $\zeta$-phase content, and the $\gamma$-phase content decreases from 100% to the bulk $\gamma$-phase content. The $\zeta$ phase also has a constant carbon to metal ratio across the phase composition gradient region 440, and then this ratio is maintained within the bulk composition region 410. Thus, although the phase composition and chemical composition are somewhat related, these are distinct properties of the material which can vary from one another.

Figure 6:
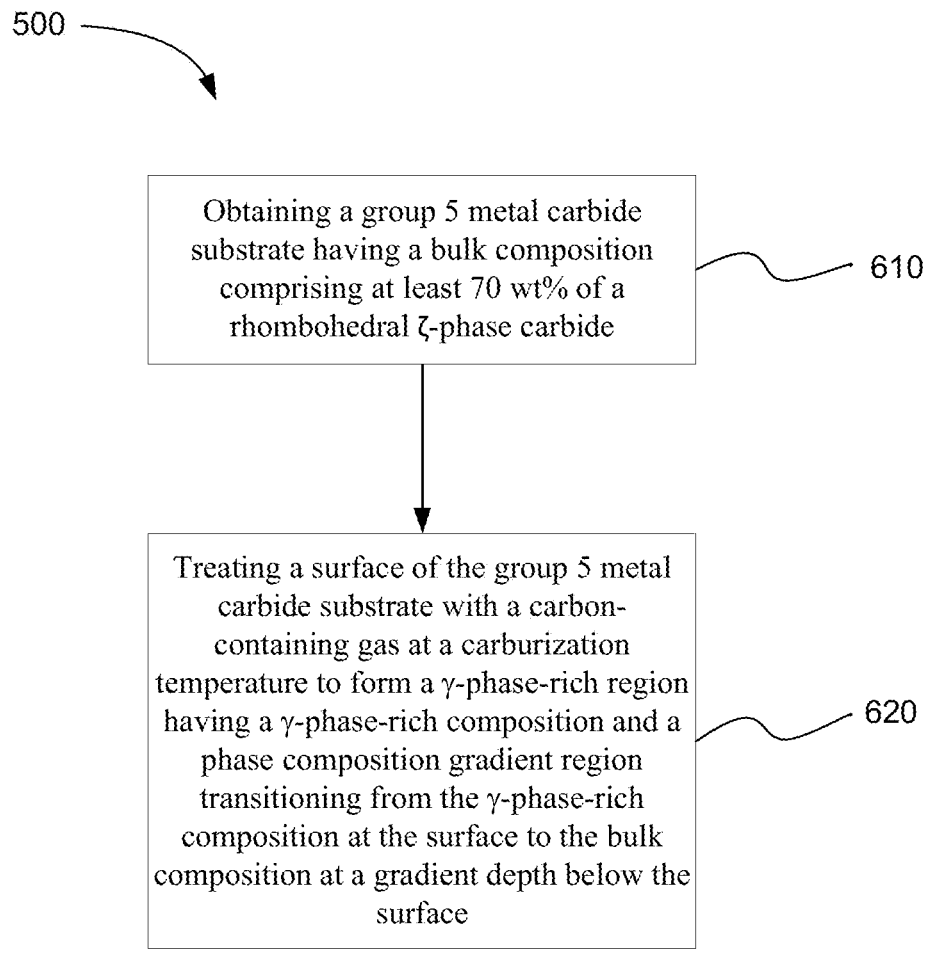
FIG. 6 shows a flowchart of a method of making a functionally graded carbide body in accordance with an embodiment of the present technology.

The present technology also encompasses methods of making functionally graded carbides. FIG. 6 shows one example of a method 500 for making a functionally graded carbide body. The method includes obtaining a group 5 metal carbide substrate having a bulk composition region comprising at least 70 wt % of a rhombohedral $\zeta$-phase carbide 510; and treating a surface of the group 5 metal carbide substrate with a carbon-containing gas at a carburization temperature to form a $\gamma$-phase-rich region having a $\gamma$-phase-rich composition region and a phase composition gradient region transitioning from the $\gamma$-phase-rich composition region at the surface to the bulk composition region at a gradient depth below the surface 520. Various aspects of these and other embodiments of functionally graded carbides and methods of making functionally graded carbides are described in more detail below.

The functionally graded carbide body shown in FIG. 4 has a simple shape with a single flat surface that has been modified to form a phase composition gradient. However, functionally graded carbide bodies can be made having any desired shape, including planar and contoured surfaces. The functionally graded carbide bodies can be useful as cutting tools, drill bits, wear inserts, balls and seats in ceramic valves, high-pressure and high-temperature anvils used in diamond synthesis, or any other tool or object requiring high hardness, fracture toughness, temperature resistance, and/or corrosion resistance. The phase composition gradient is formed by exposing surfaces of a carbide substrate to a carbon-containing gas. Therefore, the substrate can have any desired shape, even complex shapes such as in drill bits, and all exposed surfaces can be treated with the carbon containing gas to form the phase composition gradient.

Because this process forms the γ-phase-rich region and phase composition gradient region by transforming a portion of the ζ-phase carbide to γ-phase carbide, as opposed to adding a layer of additional γ-phase material onto the ζ-phase substrate, the process does not substantially change the size or shape of the substrate. Therefore, the substrate can be formed to have the final desired size and shape of the final functionally graded carbide body before the carburization treatment is performed. The carburization treatment does not substantially change the dimensions of the substrate, so the final functionally graded carbide body will retain the same dimensions. In some examples, the substrate can be formed by sintering a particulate mixture in the desired shape of the final functionally graded carbide body. In other embodiments, the substrate can be milled or otherwise machined to the desired shape before the carburization treatment. Because the ζ-phase is softer than the γ-phase, the soft ζ-phase can advantageously be milled to the desired final shape, and then a hard γ-phase surface can be formed through the carburization treatment described herein. After the carburization treatment, no additional milling is necessary because the dimensions of the substrate do not change during the treatment.

The substrate can be formed of a group 5 metal carbide. For example, the substrate can be tantalum carbide, niobium carbide, vanadium carbide, or combinations thereof. In some embodiments, the substrate can be a pure or substantially pure carbide. In other words, the substrate can be entirely or substantially made up of only a group 5 metal carbide, without a metallic binder as is used in cemented carbides.

In additional embodiments, the group 5 metal carbide substrate can have a bulk composition region comprising at least 70 wt % of the rhombohedral ζ-phase. In other embodiments, the bulk composition region can include more of the ζ-phase, such as at least 80 wt %, at least 90 wt %, or at least 95 wt % of the ζphase. Using certain methods of forming the group 5 metal substrate, even higher amounts of the ζ-phase can be obtained in the substrates. Other components of the bulk composition region can include $\gamma$-TaC$_y$ and/or $\alpha$-Ta$_2$C$_{y'}$. In some examples, the bulk composition region can include less than 20 wt %, less than 15 wt %, less than 10 wt %, or even less than 5 wt % of the $\gamma$-TaC$_y$ phase. In further examples, the bulk composition region can include less than 10 wt %, less than 5 wt %, or less than 2 wt % of the $\alpha$-Ta$_2$C$_{y'}$ phase.

In certain embodiments, the overall carbon to group 5 metal atomic ratio of the bulk composition region can be in the range that theoretically allows for a pure ζ-phase. In the case of tantalum carbide, the bulk composition region can have a carbon to tantalum atomic ratio from about 0.65 to about 0.68. In the case of niobium carbide, the bulk composition region can have a carbon to niobium atomic ratio of about 0.67 to about 0.68. In the case of vanadium carbide, the bulk composition region can have a carbon to vanadium atomic ratio of about 0.61 to about 0.62. In other embodiments, the carbon to group 5 metal atomic ratio can be outside these ranges while still being sufficient to produce a bulk composition region that is at least 70 wt % of the ζ-phase.

The group 5 metal carbide substrate can be obtained by mixing powders containing the group 5 metal and carbon, and then sintering the powders to form the substrate. In one embodiment, the group 5 metal carbide substrate can be obtained by assembling a particulate mixture of a group 5 metal source powder and a carbon source powder. The particulate mixture can then be sintered to form the group 5 metal carbide substrate having a bulk composition region comprising at least 70 wt % of the rhombohedral ζ-phase.

In certain examples, the group 5 metal source powder can be a pure group 5 metal powder or a group 5 metal hydride powder. In one example, the group 5 metal source powder can be tantalum hydride powder. Tantalum hydride can exist in multiple phases. For example, the tantalum hydride powder can include α-, (β-, γ-, δ-, ε-, or ζ-phase tantalum hydride. In some cases, the tantalum hydride powder used in the present technology can include β-phase TaH$_x$. In some cases, the tantalum hydride powder can be prepared by hydrogenation of a tantalum metal powder. This can be performed as a step in the method of forming the ζ-phase tantalum carbide. Alternatively, a commercially available tantalum hydride powder can be obtained and used in the process. The group 5 metal source powder can have an average particle size of 2-20 μm, or in some cases 5-10 μm. Further, the group 5 metal source powder can have a bimodal size distribution, with small single particles and larger agglomerations of particles. For example, tantalum hydride powder can have a primary distribution of single particles with an average particle size of 2-5 μm and a secondary distribution of agglomerates with an average agglomerate size of 5-20 μm. Smaller and more uniform particle sizes can be useful for obtaining both high green density and high sintered density. In further examples, metallic tantalum powder can be used as the group 5 metal source powder.

The carbon source powder can include graphite powder, amorphous carbon powder, group 5 metal carbide powder, or combinations thereof. In one example, γ-phase tantalum carbide can be used as the carbon source powder. In further examples, any tantalum carbide powder with the formula TaC$_y$ can be used where y is greater than about 0.68. Use of γ-TaC powder as the carbon source instead of carbon powder can provide better control of chemistry by limiting carbon volatilization during pressureless sintering. The carbon source powder can have an average particle size from about 0.5 μm to about 20 μm. In some examples, γ-TaC powder can have an average particle size that is roughly the same as the tantalum hydride powder described above. In other examples, the γ-TaC powder can have an average particle size that is less than the tantalum hydride powder. In one example, the γ-TaC powder can have an average particle size of less than about 2 μm and often less than about 1 μm.

The group 5 metal source powder and carbon source powder can be mixed in an appropriate ratio to provide a carbon to group 5 metal atomic ratio within or near the ζ-phase range. The particulate mixture can then be formed into a compact and sintered. In some embodiments, the sintering process can be performed at low pressure, such as from about 0.01 atm to about 2 atm. In other embodiments the sintering can be performed by hot-pressing or hot-isostatic-pressing. The sintering temperature can be from about 1350° C. to about 1900° C. In other examples, the sintering temperature can be from about 1700° C. to about 1900° C. The sintering can be performed for a hold time from about 600 s to about 60,000 s. In a particular example, the sintering can be performed for a hold time from 600 s to 6,000 s. In another particular example, the sintering can be performed for a hold time sufficient to reach a densification of at least 90% and in some cases at least 94%. The compact can often be pressureless sintered to greater than 94% of theoretical density. In a further example, the compact can be pressureless sintered to greater than 97% of theoretical density. The final sintered material can include a majority of ζ-phase with smaller amounts of γ-phase and trace amounts of group 5 metal oxides. If high pressure sintering methods are used, the compact can optionally be sintered to even higher densities, such as greater than 99% of the theoretical density. High pressure sintering methods can also in some cases result in a higher ζ-phase content. However, pressureless sintering can be used to obtain sintered materials with more than 80 wt %, more than 85 wt %, or more than 86 wt % of the ζ-phase.

After the group 5 metal carbide substrate is obtained, a surface of the substrate can be treated with a carbon-containing gas to form a γ-phase-rich region and phase composition gradient region at the surface. The carbon-containing gas can include a hydrocarbon such as methane, ethane, propane, butane, natural gas, mixtures thereof, or the like as a carbon source. During the treatment, the carbon containing gas can provide carbon atoms that are adsorbed on the surface and diffuse into the substrate. The additional carbon atoms convert a portion of the substrate near the surface from the ζ-phase to the γ-phase. This forms a γ-phase-rich transformed layer at the surface. Because the amount of carbon diffused into the substrate decreases continuously with increasing depth beneath the surface, an overall chemical composition gradient can form that transitions continuously from a 1:1 carbon to group 5 metal atomic ratio at the surface to a ratio corresponding to the ζ-phase at a gradient depth below the surface. This results in a γ-phase-rich region at the surface, which transitions to the bulk phase composition through a phase composition gradient. As used herein, "gradient depth" refers to the depth at which the composition reaches the bulk composition region of the substrate, or in other words, the depth at which the phase composition gradient ends. Accordingly, during treatment, the gradient depth and γ-phase-rich depth progressively increase from zero to a desired gradient depth as carbon diffuses into the substrate.

In some embodiments, the carbon-containing gas can be a mixture of a carbon source gas, such as a hydrocarbon, and one or more other gases. The gases in the mixture can be non-oxidizing gases. In some cases the gas mixture can include a reducing gas. In certain embodiments, the carbon-containing gas can include a mixture of a hydrocarbon and hydrogen. In one particular embodiment, the carbon-containing gas can be a mixture of methane and hydrogen. In further embodiments, the methane or other hydrocarbon can be present at a concentration of about 1 wt % to 10 wt % in the carbon-containing gas. In one particular embodiment, the carbon-containing gas can be a mixture of about 5 wt % methane in hydrogen. In still further embodiments, the carbon-containing gas can be constantly flowing so that the composition of the carbon-containing gas remains substantially constant during the carburization treatment.

The carburization treatment with the carbon-containing gas can be performed at a carburization temperature from 1200° C. to 1600° C., and in some cases about 1270° C. to about 1500° C. The group 5 metal carbide body can be held at a temperature in this range under the carbon-containing gas atmosphere for a sufficient time to form the phase composition gradient. In some embodiments, the treatment can be performed for a carburization time from about 10 hours to about 50 hours. Concentration of carbon in the carbon-containing gas can also affect rate of deposition, depth, and surface morphology.

On the carburized surface, the transformed phase is typically 100 wt % γ-TaC with a carbon to tantalum atomic ratio of 1. At depths below the surface, the wt % of the γ-phase can remain at 100%, while the stoichiometry, i.e., C/Ta atomic ratio decreases from 1 to about 0.78 at a transition depth indicated by the maximum hardness. Below this depth, weight percent of the γ-phase decreases and the weight percent of the ζ-phase increases until the bulk substrate composition is reached. Within the bulk composition region, the carbon to metal ratio can once again vary, and in the case of TaC can often vary from about 0.68 to a bulk value of 0.66.

Group 5 metal carbides can exist in the γ-phase over a range of carbon to group 5 metal atomic ratios. For example, if the group 5 metal is tantalum, then the γ-phase can exist at carbon/tantalum atomic ratios from about 0.78 to 1.0. Above a ratio of 1.0, which is the stoichiometric ratio for γ-phase $TaC_y$, a mixture of γ-phase $TaC_y$ and pure carbon will be present. Most often the C/Ta atomic ratio can be 1.0 at the outer surface of the γ-phase-rich region. In another example, if the group 5 metal is niobium, then the γ-phase can exist at carbon/niobium atomic ratios from about 0.73 to 1.0. In a further example, if the group 5 metal is vanadium, then the γ-phase can exist at carbon/vanadium atomic ratios from about 0.70 to about 0.88. Therefore, in various embodiments, the γ-phase-rich composition region can have a carbon to group 5 metal atomic ratio within one of these ranges. In some cases, a layer of pure carbon can be formed on the surface, and the layer of pure carbon can be in equilibrium with pure γ-phase at the surface. Generally, the γ-phase-rich region can have 70% or greater γ-phase composition, and often greater than about 90% γ-phase.

The γ-phase-rich region can begin at the surface with the γ-phase-rich composition and the phase composition gradient region can transition slowly from the γ-phase-rich composition to the bulk composition that is made up of mostly ζ-phase. In some cases, the γ-phase-rich composition can have a carbon to group 5 metal atomic ratio that decreases with increasing depth below the surface. In one example, the carbon to group 5 metal atomic ratio can be at or about 1.0 at the surface, and then the ratio can continuously decrease with increasing depth. Because the γ-phase can exist at the range of carbon to group 5 metal atomic ratios, this results in a layer of γ-phase carbide with substantially no ζ-phase carbide. The ζ-phase begins to form only when the carbon to group 5 metal atomic ratio decreases below the lower limit of the γ-phase. As shown in FIG. 4, a γ-phase-rich region 420 can extend from the surface 430 down to a first depth 460, at which depth the γ-phase-rich composition begins to transition to the bulk composition through a phase composition gradient region 440. In other words, substantially no ζ-phase is present between the first depth 460 and the surface. In this range, a layer of substantially pure γ-phase can be formed, although the carbon to group 5 metal atomic ratio can vary within this layer. In the phase composition gradient region, the carbon to metal ratio in the γ-phase remains constant at the lower limit of the ratio for the γ-phase, while the carbon to metal ratio in the corresponding ζ-phase also remains constant as illustrated in FIG. 5. However, the overall carbon to metal ratio of the material continues to decrease through the phase composition gradient region as more and more of the ζ-phase forms, until the bulk composition region 410 is reached at the gradient depth 450.

Thus, in some embodiments, a functionally graded carbide body can have a layer of pure or substantially pure γ-phase down to a first depth, at which depth the ζ-phase is present. The region where the ζ-phase content increases while the γ-phase content decreases is referred to as the phase composition gradient region. The amount of ζ-phase can increase until the gradient depth, at which depth the phase composition reaches the bulk composition. In some cases, this phase composition gradient can be continuous. As used herein, "continuous" does not necessarily imply that the rate of change of relative amounts of γ-phase and ζ-phase is uniform over the entire region, or that the relative amounts of the γ-phase and ζ-phase are necessarily changing at every point in the gradient. Rather, the gradient is "continuous" because it is not discontinuous. In other words, the gradient does not include any discontinuities, such as a sharp boundary between γ-phase and ζ-phase. Such sharp boundaries can form in other processes such as deposition processes, in which a layer of one phase is deposited onto a surface of another phase. In contrast, the carburization process described herein does not add a layer of new material. Instead, the process transforms the substrate material at a surface by adding carbon atoms that diffuse into the surface. The concentration of diffused carbon atoms naturally decreases with increasing depth below the surface, forming a gradient.

The gradient depth can be controlled by the carburization temperature, carburization time, and concentration of the carbon-containing gas. In some embodiments, the gradient depth can be from about 5 micrometers to about 50 micrometers. In further embodiments, the gradient depth can be from about 10 micrometers to about 25 micrometers. The depth at which the ζ-phase begins to appear can also vary depending on carburization temperature, carburization time, and concentration of the carbon-containing gas. In some embodiments, this first depth can be from about 2 micrometers to about 30 micrometers. In further examples, this first depth can be from about 5 micrometers to about 10 micrometers.

In certain examples, the γ-phase-rich composition can have a carbon to group 5 metal atomic ratio of about 1.0 at the surface (or, in the case of vanadium, about 0.88). The ratio can decrease with increasing depth below the surface down to the lower limit of the ratio for the γ-phase. At this point, ζ-phase carbide can appear and the relative amount of ζ-phase can increase until the bulk composition is reached at the gradient depth.

It has been found, however, that forming a γ-phase-rich composition with a carbon to group 5 metal atomic ratio of 1.0 at the surface may not provide the maximum surface hardness for the functionally graded carbide. Without being bound to a specific theory, it is believed that reducing the carbon to group 5 metal atomic ratio below the stoichiometric ratio of 1.0 can increase the hardness of the γ-phase carbide. Thus, a γ-phase carbide having a lower ratio can actually be harder than a stoichiometric γ-phase with a ratio of 1.0. Experiments have shown that the hardness increases as the ratio decreases all the way to the lower limit ratio, where ζ-phase carbide begins to appear. Therefore, the surface hardness of the functionally graded carbide body can be increased by forming the chemical composition gradient such that the γ-phase-rich composition at the surface has a carbon to group 5 metal atomic ratio of less than 1.0. In certain embodiments, the γ-phase-rich composition can have a carbon to group 5 metal atomic ratio of about 0.78 to about 0.85 at the surface. In a particular embodiment, the γ-phase-rich composition can have a carbon to group 5 metal atomic ratio of about 0.8. This can provide a greater surface hardness for the functionally graded carbide body.

The carburization treatment tends to naturally form a chemical composition gradient that starts with the stoichiometric ratio of carbon to group 5 metal at the surface. Thus, in some embodiments, the carburization treatment can produce a functionally graded carbide body with a carbon to group 5 metal ratio of about 1.0 at the surface. In order to obtain a lower ratio at the surface, the functionally graded carbide body can be annealed to partially decarburize the surface. The annealing treatment can be performed at an annealing temperature in a de-carburizing atmosphere, such as hydrogen without a carbon-containing gas. Other de-carburizing atmospheres can also be used. The annealing temperature can be lower than the carburization temperature to suppress potential reverse transformation and reduction in thickness of the transformed γ-phase-rich layer. In one embodiment, the annealing temperature can be from about 1000° C. to about 1200° C. In further embodiments, the annealing can be performed for a time from about 1 hour to about 10 hours. In some cases, the annealing time and temperature can be sufficient to produce a carbon to group 5 metal atomic ratio of about 0.8 at the surface. In still further embodiments, the annealing can be performed under a hydrogen atmosphere.

In some embodiments, the annealing treatment can result in a substantially constant carbon to group 5 metal atomic ratio to a first depth from the surface within the γ-phase-rich region, and then the ratio transitions continuously to the ratio in the bulk composition at the gradient depth. In one example, the carbon to group 5 metal atomic ratio can be substantially uniform from the surface down the first depth, at which point the ratio decreases to allow the ζ-phase to form. In another example, the carbon to group 5 metal atomic ratio can be about 0.8 throughout the layer of γ-phase-rich composition down to the first depth.

By treating a group 5 metal carbide substrate having a high ζ-phase bulk composition with the carburization treatment and optionally the annealing treatment described above, a functionally graded carbide body having both high surface hardness and high fracture toughness can be formed. In some embodiments, the functionally graded carbide body can have a surface hardness HK0.1 from about 10 GPa to about 25 GPa. In further embodiments, the functionally graded carbide body can have a fracture toughness from about 10 MPa√m to about 15 MPa√m.

The functionally graded carbide body can also have a high fracture strength. In some cases, the γ-phase-rich composition at the surface of the carbide body can have residual compressive stress due to a mismatch in density between the γ-phase and the ζ-phase. For example, the theoretical density of γ-phase tantalum carbide is 14.47 g/cm$^3$, whereas the theoretical density of ζ-phase tantalum carbide is 14.82 g/cm³. Therefore, when the γ-phase layer is formed during carburization, the γ-phase is dense and subjected to residual compressive stress. This compressive stress can discourage propagation of fractures, increasing the fracture strength of the functionally graded carbide body. The strength-controlling flaw size can be limited to the thickness of the γ-phase layer, and the fracture toughness of the carbide body can be the higher fracture toughness of the bulk substrate. Mismatch in coefficient of thermal expansion between the γ-phase and ζ-phase may also affect the residual stress at various temperatures.

The fracture strength of the functionally grade carbide body can also be increased by reducing the grain size of the γ-phase at the surface. In one example, this can be accomplished by carburizing the carbide substrate at a lower temperature. Carburization temperatures in the range of 1270° C. to 1500° C. can result in small grains, increasing the fracture strength. In some embodiments, the γ-phase at the surface can have an average grain size of 1 μm to 5 μm.

EXAMPLES

Tantalum carbide monoliths were formed of ζ-Ta$_4$C$_{3-x}$ in the form of type B bend bars, 4×3×45 mm in dimensions, as specified in ASTM Standard C-1161-02 for measurements of flexural strengths of advanced ceramics. The ζ-Ta$_4$C$_{3-x}$ monoliths were processed by hot-pressing and contained 95 wt % of ζ-Ta$_4$C$_{3-x}$. The bar specimens were supported on one end and the long faces were exposed to a flowing gas mixture of hydrogen and 5% methane (CH$_4$) in a tube furnace at a fixed temperature in the range of 1270-1500° C. for a fixed time period in the range of 10-20 hours to carburize the specimens.

The carburized specimens were characterized by three techniques. (a) The microstructure on an etched cross-section in the vicinity of the carburized surface was assessed using an optical microscope (Model: MEF4M, Leica, Wein, Austria). (b) Crystal phases were identified and weight percent of phases in the substrate and the carburized surface were estimated using an X-ray diffractometer (XRD, Model Philips X'Pert-MPD, PANalytical Inc., Westborough, Mass.) and associated software. (c) Hardness as a function of distance from the carburized surface on a cross section was measured using a Knoop microhardness tester (Model: Tukon 1202, Wilson, Shanghai, China) at 1 N load.

Figure 7:
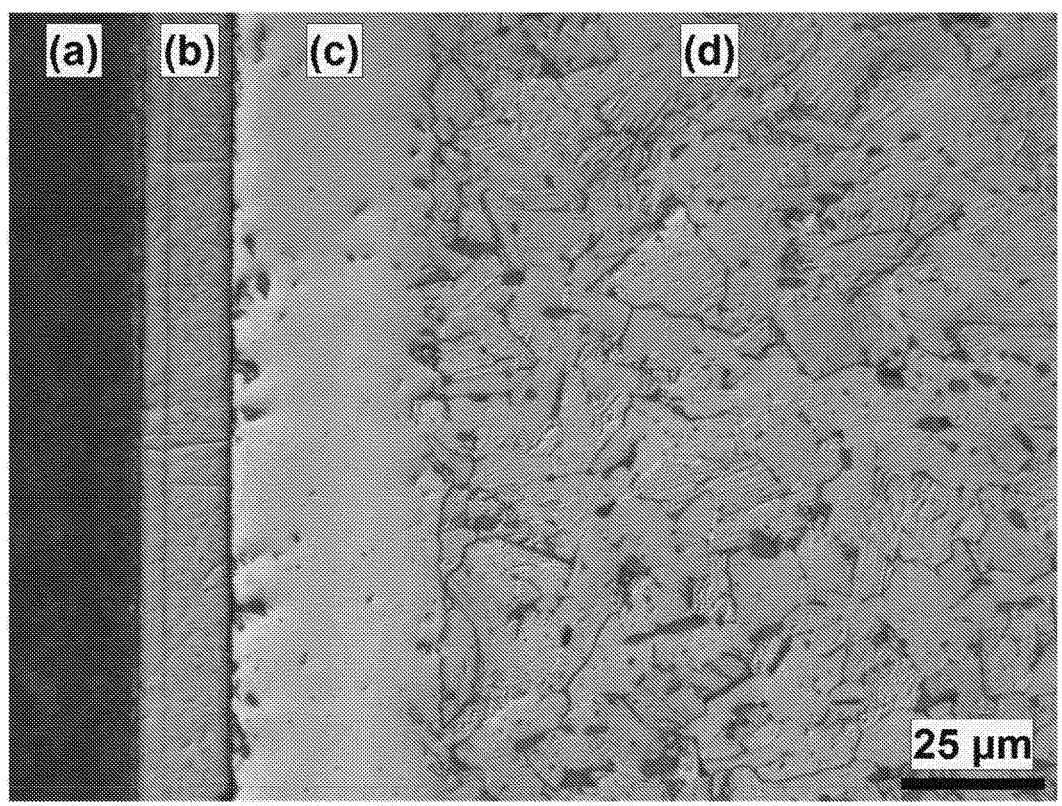
FIG. 7 shows a microscope image of a cross section of a functionally graded carbide body in accordance with an embodiment of the present technology.

FIG. 7 shows the microstructure on the cross section in the vicinity of the outer surface of a ζ-Ta$_4$C$_{3-x}$ specimen carburized at 1500° C. for 20 hours. The four layers visible in FIG. 7, in sequence from left to right, are (a) the mounting material, (b) an electroless Ni layer used to minimize damage to the specimen edge, (c) γ-TaC$_y$ layer, and (d) ζ-Ta$_4$C$_{3-x}$ substrate. The γ-TaC$_y$ surface layer was more resistant to etching than the ζ-Ta$_4$C$_{3-x}$ substrate, and the transition between the two phases occurred over a short distance. The thickness of the transformed γ-TaC$_y$ layer in FIG. 7 is about 35 μm. The grains in the ζ-Ta$_4$C$_{3-x}$ substrate were elongated and tabular with lengths in the range of 10-20 μm and widths in the range of 5-10 μm. The grains in the γ-TaC$_y$ layer were not adequately resolved for size measurements. The thickness of the transformed surface layers carburized at 1270° C. and 1470° C. for 20 hours were 5 μm and 25 μm, respectively.

Figure 8:
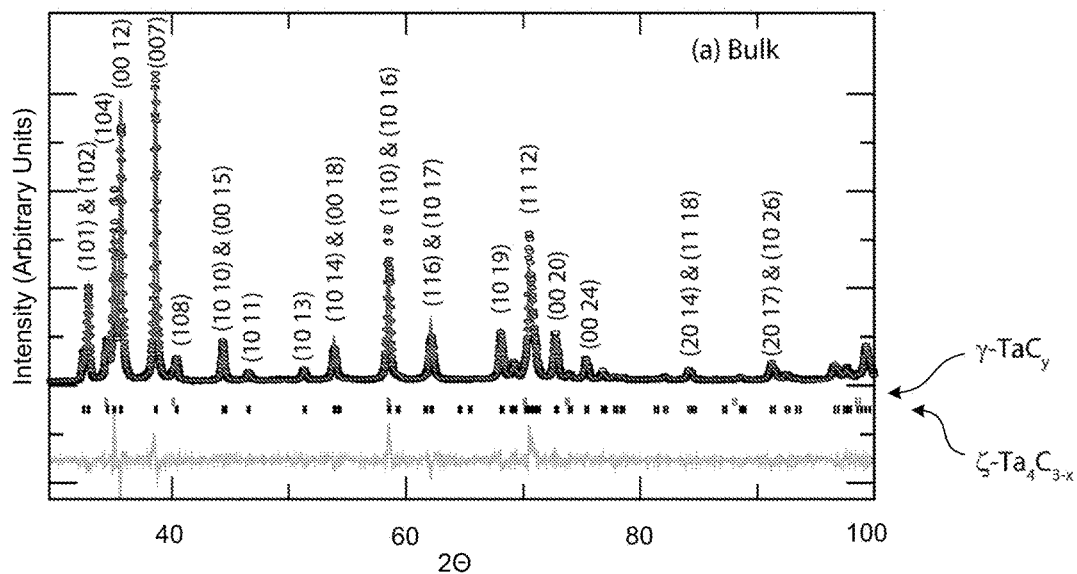
FIG. 8 shows an X-ray diffraction (XRD) pattern of a bulk substrate having 95 wt % of ζ-$Ta_4C_{3-x}$ and 5 wt % γ-$TaC_y$ in accordance with an embodiment of the present technology.
Figure 9:
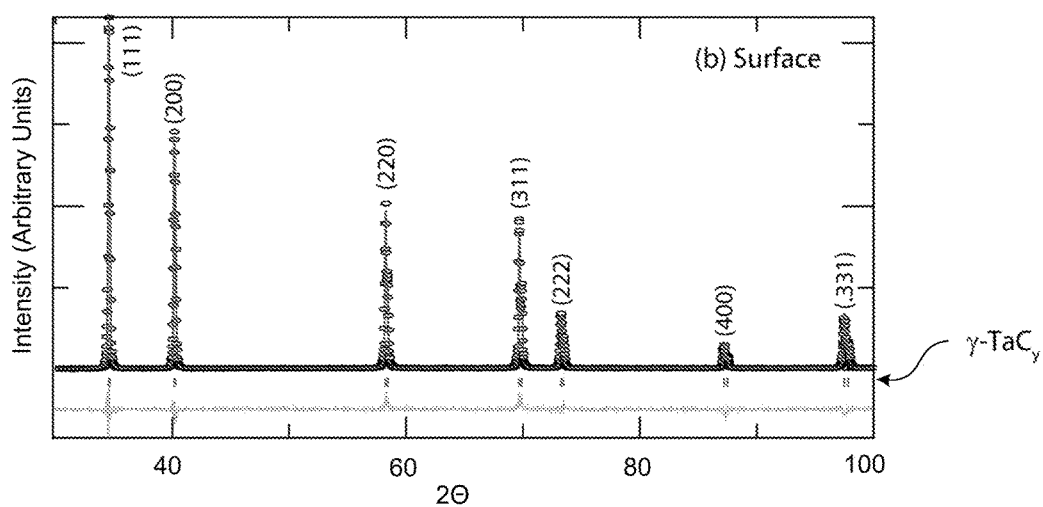
FIG. 9 shows an X-ray diffraction (XRD) pattern of a 100 wt % γ-$TaC_y$ surface layer of a functionally graded carbide body in accordance with an embodiment of the present technology.

The XRD patterns of the bulk and of the surface layer are shown in FIG. 8 and FIG. 9, respectively. These figures show intensity (in arbitrary units) vs. 2θ. The small boxes below the intensity graph represent peaks that correspond to the γ-TaC$_y$ or ζ-Ta$_4$C$_{3-x}$ phases. The diffraction pattern for the bulk was taken on a ground and polished wide surface of the bar specimen prior to carburization. The diffraction pattern for the surface was taken on the same surface after carburization and light polishing to remove the loosely adhering carbon layer. The bulk contained 95 wt % of ζ-Ta$_4$C$_{3-x}$ and 5 wt % γ-TaC$_y$. The surface of the transformed layer was essentially 100 wt % γ-TaC$_y$. The lattice parameter calculated from the diffraction pattern of FIG. 9 was 4.455 Å. This corresponds to a stoichiometric composition of γ-TaC on the carburized surface based on the calibration of lattice parameter and C/Ta atomic ratio for the fcc γ-TaC$_y$ phase.

Figure 10:
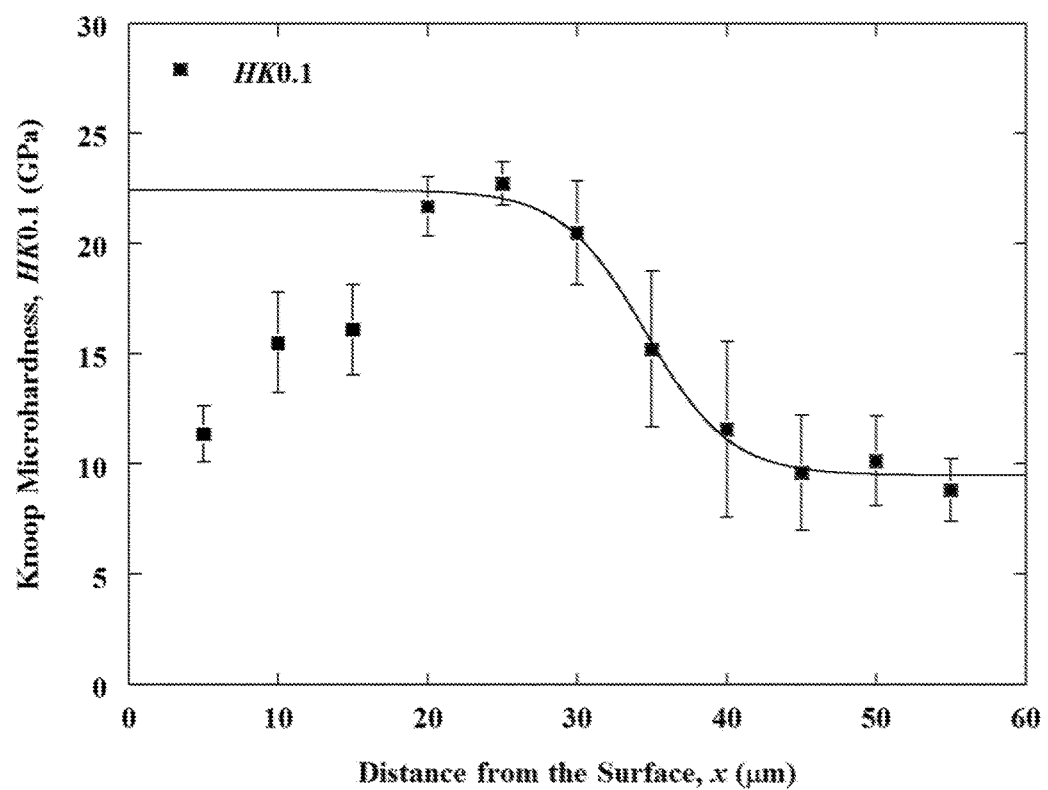
FIG. 10 is a graph of Knoop microhardness (HK0.1) vs. distance from the surface of a functionally graded carbide body in accordance with an embodiment of the present technology.

FIG. 10 shows the variation of Knoop microhardness, HK 0.1, as a function of distance from the carburized surface. The hardness was 11.4 GPa at a distance, x=5 μm, from the carburized surface. The hardness increased with increasing distance from the carburized surface and reached a maximum value of 22.7 GPa at a distance of x=25 μm. For x>25 μm, the hardness decreased gradually and reached a plateau value of 9.5 GPa corresponding to the bulk ζ-Ta$_4$C$_{3-x}$ phase. The drop in hardness for x<25 μm was initially unexpected. However, it is believed that the maximum in hardness at x=25 μm was due to non-stoichiometry in the γ-TaC$_y$ layer.

The solid line in FIG. 10 is the following empirical sigmoidal function fitted to the data covering the range, x=25 μm to x=55 μm:

$$H(x) = (H_\gamma - H_\zeta)\left[1 - \frac{1}{1 + e^{-\left(\frac{x-\xi}{\lambda}\right)}}\right] + H_\zeta \quad (2)$$

In Eq. (2), H$_\gamma$, H$_\zeta$, ξ, and λ are fitting parameters with the following interpretations. H$_\gamma$ is an upper-bound hardness of the γ-TaC$_y$ layer, H$_\zeta$ is the lower-bound hardness of the ζ-Ta$_4$C$_{3-x}$ bulk, ξ is a measure of the thickness of the transformed layer and corresponds to H(ξ)=(H$_\gamma$+H$_\zeta$)/2, and λ is a scaling parameter that defines the 'sharpness' of the hardness transition from the surface layer to the bulk. The solid line shown in FIG. 10 represents a 'best fit' of Eq. (2) resulting in the following values of the parameters: H$_\gamma$=22.4 GPa, H$_\zeta$=9.5 GPa, ξ=34.6 μm, and λ=2.8 μm.

The results of the experiments demonstrate the feasibility of designing and processing a functionally-graded carbide in the Ta—C system. A hard surface layer of γ-TaC$_y$ was formed in the surface of a soft and tough substrate of ζ-Ta$_4$C$_{3-x}$ by surface carburization. The highest Knoop hardness in the γ-TaC$_y$ layer, HK0.1=22.4 GPa, was measured at a depth of x=25 μm, while the Knoop hardness of the ζ-Ta$_4$C$_{3-x}$ bulk was 9.5 GPa. The fracture toughness measured by the single-edge-precracked-beam tests were 5.3 MPa√m for the stoichiometric γ-TaC phase and 13.8 MPa√m for a composite of 95 wt % ζ-Ta$_4$C$_{3-x}$ phase and 5 wt % γ-TaC$_y$ phase. Thus, the goals of a high hardness on the surface and a high fracture toughness in the bulk were achieved by functional grading in the Ta—C system.

The variation of the Knoop microhardness within the γ-TaC$_y$ layer, from HK0.1=11.4 GPa at x=5 μm to HK0.1=22.7 GPa at x=25 μm, was unexpected. This result may be due to the following reason. At the end of the carburization treatment, the specimen was cooled rapidly from the carburization temperature, 1500° C., by switching off the tube furnace. This rapid cooling may have 'frozen in' a gradient in carbon concentration or the C/Ta atomic ratio in the γ-TaC$_y$ phase from the stoichiometric value, y=1 at x=0 to about y=0.8 at a depth where both γ-TaC$_y$ and $\zeta$-Ta$_4$C$_{3-x}$ phases co-exist. Both experiments and theoretical calculations indicate that hardness of the $\gamma$-TaC$_y$ phase increases with decreasing value of y in the range, y=1 to 0.8. For example, an increase in Vickers hardness, HV1, from 13.5 GPa to 20 GPa as y decreases from 1 to 0.8 has been reported. Lattice parameter measured on the carburized surface suggests a stoichiometric $\gamma$-TaC phase on the surface. This is consistent with the Ta—C phase diagram since $\gamma$-TaC is in equilibrium with free carbon on the surface. The phase diagram also indicates that, y~0.8, at 1500° C. in the two-phase region consisting of $\gamma$-TaC$_{0.8}$ and $\zeta$-Ta$_4$C$_{2.72}$.

The above discussion of the possible role gradient in non-stoichiometry plays in causing the hardness variation within the $\gamma$-TaC$_y$ layer suggests some avenues for optimizing the chemistry of the layer for both uniform and increased hardness. Thus, for example, the stoichiometry or C/Ta ratio within the $\gamma$-TaC$_y$ layer can be made more uniform by a homogenization or annealing treatment. This can be done by annealing the carburized specimen in a pure H$_2$ environment at a temperature lower than that used for carburization. The H$_2$ environment can promote decarburization and lower the C/Ta ratio at the surface, while the lower temperature will suppress potential reverse transformation and a reduction in the thickness of the transformed layer.

It is to be understood that the above-referenced arrangements are illustrative of the application for the principles of the present invention. Thus, while the present invention has been described above in connection with the exemplary embodiments, it will be apparent to those of ordinary skill in the art that numerous modifications and alternative arrangements can be made without departing from the principles and concepts of the invention as set forth in the claims.

What is claimed is:

1. A functionally graded carbide body of a group 5 metal carbide, comprising:
   a bulk composition region comprising at least 70 wt % of a rhombohedral $\zeta$-phase carbide of the group 5 metal carbide;
   a $\gamma$-phase-rich region having a $\gamma$-phase-rich composition at a surface of the carbide body; and
   a phase composition gradient region transitioning from the $\gamma$-phase-rich composition region to the bulk composition region at a gradient depth below the surface.

2. The functionally graded carbide body of claim 1, wherein the $\gamma$-phase-rich composition region is from 70 wt % to 100 wt % $\gamma$-phase.

3. The functionally graded carbide body of claim 1, wherein the phase composition gradient region transitions substantially continuously from the $\gamma$-phase-rich composition region to the bulk composition region.

4. The functionally graded carbide body of claim 1, wherein the $\gamma$-phase-rich composition region has a substantially uniform carbon to group 5 metal atomic ratio to a first depth from the surface, and then transitions continuously to the bulk composition region at the gradient depth.

5. The functionally graded carbide body of claim 4, wherein the first depth is from 2 micrometers to 30 micrometers.

6. The functionally graded carbide body of claim 1, wherein the gradient depth is from 5 micrometers to 50 micrometers.

7. The functionally graded carbide body of claim 1, wherein the carbide body is a substantially pure carbide.

8. The functionally graded carbide body of claim 1, wherein the carbide body has a surface hardness HK0.1 of about 10 GPa to about 25 GPa.

9. The functionally graded carbide body of claim 1, wherein the carbide body has a bulk fracture toughness of about 10 MPa$\sqrt{}$m to about 15 MPa$\sqrt{}$m.

10. The functionally graded carbide body of claim 1, wherein the carbide body has a residual compressive stress at the surface.

11. The functionally graded carbide body of claim 1, wherein the group 5 metal is tantalum.

12. The functionally graded carbide body of claim 11, wherein the $\gamma$-phase-rich composition region has a carbon to tantalum atomic ratio from about 0.78 to about 1.0.

13. The functionally graded carbide body of claim 1, wherein the group 5 metal is niobium.

14. The functionally graded carbide body of claim 13, wherein the $\gamma$-phase-rich composition region has a carbon to niobium atomic ratio from about 0.73 to about 1.0.

15. The functionally graded carbide body of claim 1, wherein the group 5 metal is vanadium.

16. The functionally graded carbide body of claim 15, wherein the $\gamma$-phase-rich composition region has a carbon to vanadium atomic ratio from about 0.7 to about 0.88.

* * * * *